United States Patent
Braasch et al.

(10) Patent No.: US 8,570,621 B2
(45) Date of Patent: Oct. 29, 2013

(54) POSITION MEASURING DEVICE

(75) Inventors: Jan Braasch, Altenmarkt (DE);
Wolfgang Holzapfel, Obing (DE);
Ulrich Benner, Trostberg (DE);
Gabriele Ehgartner, Kienberg (DE);
Robert Bernhard, Garching (DE);
Elmar Mayer, Nußdorf (DE); Martin Seichter, Wonneberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 282 days.

(21) Appl. No.: 12/989,691

(22) PCT Filed: Mar. 24, 2009

(86) PCT No.: PCT/EP2009/053437
§ 371 (c)(1),
(2), (4) Date: Jul. 18, 2011

(87) PCT Pub. No.: WO2009/132901
PCT Pub. Date: Nov. 5, 2009

(65) Prior Publication Data
US 2011/0261422 A1    Oct. 27, 2011

(30) Foreign Application Priority Data

May 2, 2008    (DE) .................... 10 2008 022 027

(51) Int. Cl.
*H04N 1/04* (2006.01)
(52) U.S. Cl.
USPC ............ 358/488; 358/474; 358/498; 358/497
(58) Field of Classification Search
USPC .................... 358/488, 474, 498, 497
See application file for complete search history.

(56) References Cited

U.S. PATENT DOCUMENTS

| | | | |
|---|---|---|---|
| 5,252,825 A | 10/1993 | Imai et al. | |
| 5,539,993 A * | 7/1996 | Kilpinen et al. | 33/706 |
| 6,742,275 B2 | 6/2004 | Mayer et al. | |
| 6,789,042 B2 | 9/2004 | Boyton | |
| 7,013,575 B2 | 3/2006 | Strasser et al. | |

(Continued)

FOREIGN PATENT DOCUMENTS

| | | |
|---|---|---|
| DE | 41 23 722 A1 | 1/1992 |
| EP | 1 329 696 A1 | 7/2003 |

(Continued)

*Primary Examiner* — Houshang Safaipour
(74) *Attorney, Agent, or Firm* — Brinks Hofer Gilson & Lione

(57) ABSTRACT

A position measuring device including a code having a sequence of code elements of equal width B that is disposed in a measurement direction and includes a first property and a second property. The sequence of codes elements includes a first set of code elements having the first property and a second set of code elements having the second property, wherein the first and second sets of code elements are each being disposed aperiodically. The position measuring device further including a scanning unit having a plurality of detectors for scanning the code and obtaining scanning signals, wherein a code word defining an absolute position is defined from the scanning signals. The position measuring device including an arrangement for forming an incremental signal from the scanning signals, wherein the arrangement includes a converter device and a collection device arranged downstream of the converter device and wherein the collection device forms respective intermittently periodic partial signals from the scanning signals derived from scanning positions in a spacing matrix.

26 Claims, 6 Drawing Sheets

(56) References Cited

U.S. PATENT DOCUMENTS

| | | |
|---|---|---|
| 7,461,464 B2 | 12/2008 | Mittmann et al. |
| 7,499,827 B2 | 3/2009 | Gordon-Ingram |
| 7,875,844 B2 * | 1/2011 | Sheu et al. ............... 250/231.16 |
| 7,903,262 B2 * | 3/2011 | Wagner et al. ................ 356/616 |
| 2003/0145479 A1 | 8/2003 | Mayer et al. |
| 2004/0015323 A1 | 1/2004 | Boyton |
| 2004/0118758 A1 | 6/2004 | Gordon-Ingram |
| 2007/0186431 A1 | 8/2007 | Mittmann et al. |

FOREIGN PATENT DOCUMENTS

| | | |
|---|---|---|
| EP | 1 468 254 B1 | 7/2005 |
| JP | 2007-218907 A | 8/2007 |
| WO | WO 00/06973 A1 | 2/2000 |
| WO | WO 02/01160 A1 | 1/2002 |
| WO | WO 02/084223 A1 | 10/2002 |

* cited by examiner

FIG. 2a
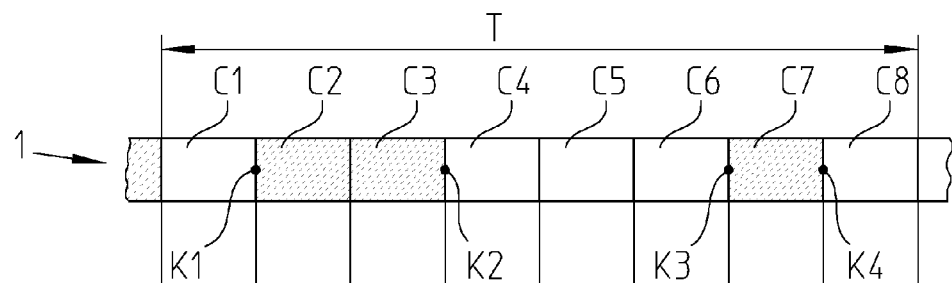
FIG. 2b
FIG. 2c
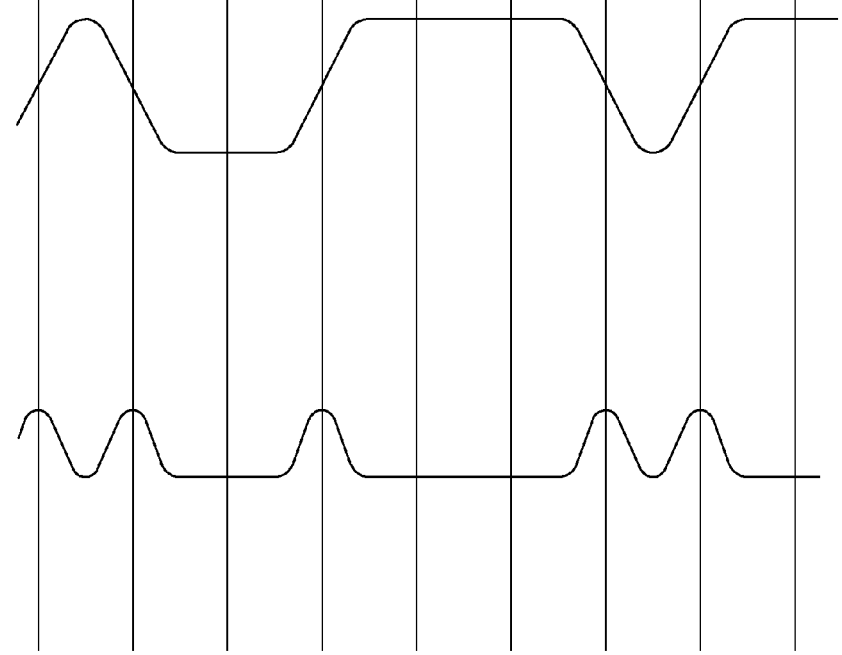

POSITION MEASURING DEVICE

Applicants claim, under 35 U.S.C. §§120 and 365, the benefit of priority of the filing date of Mar. 24, 2009 of a Patent Cooperation Treaty patent application, copy attached, Serial Number PCT/EP2009/053437, filed on the aforementioned date, the entire contents of which are incorporated herein by reference, wherein Patent Cooperation Treaty patent application Serial Number PCT/EP2009/053437 was not published under PCT Article 21(2) in English.

Applicants claim, under 35 U.S.C. §119, the benefit of priority of the filing date of May 2, 2008 of a German patent application, copy attached, Serial Number 10 2008 022 027.2, filed on the aforementioned date, the entire contents of which is incorporated herein by reference.

BACKGROUND OF THE INVENTION

1. Field of the Invention

The present invention relates to a position measuring device for position measurement and to a method for position measurement.

2. Description of the Related Art

In many fields, absolute position measuring devices are increasingly being used. In such devices, the absolute position datum is derived from a code track having code elements disposed in series with one another in the measurement direction. The code elements are provided in pseudo-random distribution, so that a certain number of successive code elements each form one bit pattern. When the scanning device is shifted by a single code element relative to the code track, a new bit pattern is already formed, and by way of the entire measurement range to be detected absolutely, a sequence of different bit patterns is available.

One such sequential code is called a chain code or pseudo-random code.

The resolution of the absolute position generated with the absolute code is not precise enough for many applications. To further enhance the resolution, it is provided that the absolute position datum be combined with a position datum from a higher-resolution incremental position measurement. However, this combination can be made with certainty only if the resolution of the absolute position datum can unequivocally define at least one division period or incremental position measurement. To achieve the requisite total resolution, besides the absolute code, a plurality of incremental divisions of different division periods are therefore provided, as shown in German Patent Disclosure DE 4123722 A1. One of these incremental divisions has a division period corresponding to the width of one code element. By interpolation of the analog periodic scanning signal derived from this and attaching it to the absolute position datum of the code and by attachment to the high-resolution incremental division, a resultant absolute datum having the resolution corresponding to the high-resolution incremental division is obtained.

Proposals already exist of deriving an incremental position datum from the absolute code itself. For instance, in European Patent Disclosure EP 1329696 A1, an absolute code is disclosed with which on the one hand an absolute position datum as well as a plurality of analog incremental scanning signals, phase-shifted from one another, can be generated. Each code element comprises two partial fields, and one of these partial fields is disclosed periodically. For unequivocal absolute determination, the other of the two partial fields must therefore unequivocally encode the code element, and therefore the code overall includes three different partial fields. For generating the analog periodic scanning signals, in-phase scanning signals from a plurality of code elements are each added together.

This has the disadvantage that because of the periodic arrangement of partial fields, a third state is required for encoding the code elements.

In International Patent Disclosure WO 02/01160 A1, which is a point of departure for the present invention, a position measuring device is described in which the incremental position datum is derived from a code that includes a sequence of code elements of equal width, disposed in series with one another in the measurement direction, and having a first and a second property. The code elements are each disposed aperiodically. The incremental position datum is ascertained by Fourier analysis.

It is disadvantageous that the Fourier analysis in turn requires a periodic arrangement of the code elements. Moreover, relatively high computing power is necessary, and real-time processing is hard to achieve.

SUMMARY AND OBJECTS OF THE INVENTION

It is an object of the present invention to create a position measuring device with which an incremental position datum can be derived from the serial code in a simple way.

This object is attained by a position measuring device including a code having a sequence of code elements of equal width B that is disposed in a measurement direction and includes a first property and a second property. The sequence of codes elements includes a first set of code elements having the first property and a second set of code elements having the second property, wherein the first and second sets of code elements are each being disposed aperiodically. The position measuring device further including a scanning unit having a plurality of detectors for scanning the code and obtaining scanning signals, wherein a code word defining an absolute position is defined from the scanning signals. The position measuring device including an arrangement for forming an incremental signal from the scanning signals, wherein the arrangement includes a converter device and a collection device arranged downstream of the converter device and wherein the collection device forms respective intermittently periodic partial signals from the scanning signals derived from scanning positions in a spacing matrix.

It is also an object of the present invention to disclose a method for position measurement, with which simple, secure generation of both an absolute and an incremental position datum from a serial code is made possible.

This object is attained with a method for position measurement that includes scanning a code by a plurality of detectors so as to generate scanning signals, wherein the code has a sequence of code elements of equal width B and disposed in a measurement direction and including a first property and a second property. The sequence of codes elements includes a first set of code elements having the first property and a second set of code elements having the second property, wherein the first and second sets of code elements are each being disposed aperiodically. The method further includes forming a code word from the scanning signals, wherein the code word defines an absolute position. The method includes forming an incremental signal from the scanning signals, wherein the forming includes obtaining a set of scanning signals at scanning positions in a spacing matrix, converting the set of scanning signals into intermittently periodic partial signals; and combining the intermittently periodic partial signals to form the incremental signal.

BRIEF DESCRIPTION OF THE DRAWINGS

The present invention will be described in further detail in conjunction with the drawings, in which:

FIG. 2a shows a possible code to be used with the position measuring device of FIG. 1;

FIG. 2b shows a scanning signal which is generated by the position measuring device of FIG. 1 in scanning the code of FIG. 2a;

FIG. 2c shows the location-dependent shape of a partial signal, generated by the converter device of the position measuring device of FIG. 1 from the scanning signal generated in accordance with FIG. 2b;

DESCRIPTION OF THE PREFERRED EMBODIMENT(S) OF THE INVENTION

Figure 1:
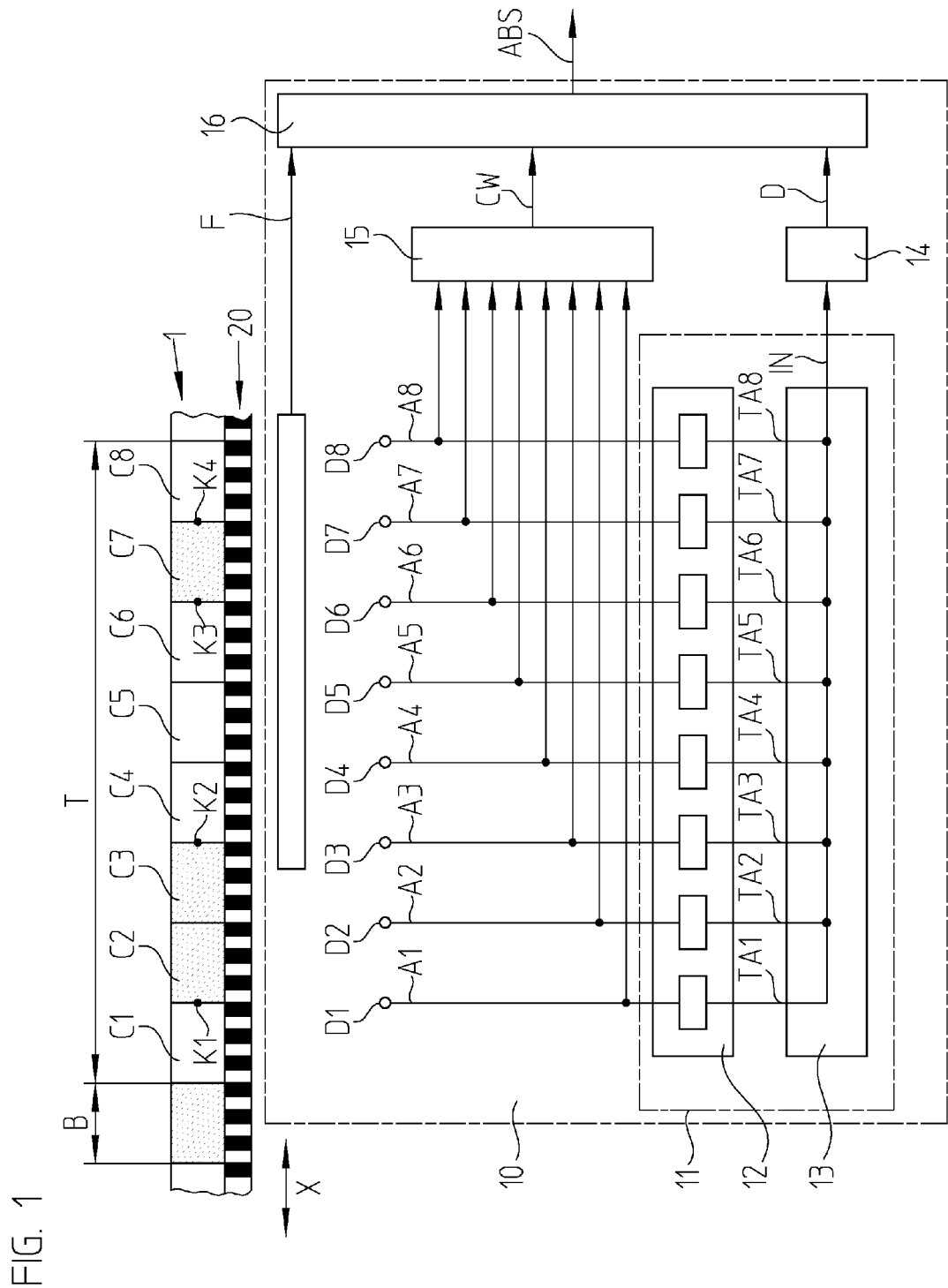
FIG. 1 shows a schematic illustration of a first embodiment of a position measuring device in accordance with the present invention.

In FIG. 1, a position measuring device designed according to the present invention is shown schematically. From this FIG. 1, the principle of the present invention will be explained, and specifically, for the sake of easier comprehension, initially only the generation of a single analog sinusoidal periodic incremental signal IN from a serial code 1 will be shown and discussed herein. This position measuring device functions on the optical scanning principle, in which the code 1 is scanned by a beam of light by the transmitted light method. For scanning the code 1, a scanning unit 10 is used, which for the position measurement is disposed movably in the measurement direction X relative to the code 1. The code 1 includes a sequence of equal-length code elements C of width B, disposed in series with one another in the measurement direction, of which in FIG. 1 the code elements C are identified by the numeral 1 through 8. Code elements C1, C4, C5, C6, C8 with a first property and code elements C2, C3, C7 with a second property are provided. The code elements C1, C4, C5, C6, C8 having the first property and the code elements C2, C3, C7 having the second property are each disposed aperiodically. The code elements C2, C3, C7 shown dark in FIG. 1 are opaque regions, and the other code elements C1, C4, C5, C6, C8 are transparent regions.

Upon each relative adjustment of the sequential code 1 relative to the scanning unit 10, a fragment T of the code 1 having M code elements C1 through C8 are simultaneously scanned; wherein M=a natural number greater than or equal to 3, and in the example, M=8. The beam of light is modulated as a function of position by the code 1, so that downstream of the code 1, a position-dependent light distribution is created, which is detected by detectors D1 through D8. The scanning signals A1 through A8 of the detectors D1 through D8 are supplied on the one hand to an evaluation unit 15, which in a known manner forms a code word CW from them that defines the absolute position. From each of the code elements C1 through C8, one bit is derived. For forming this code word CW, see for instance DE 4123722 A1.

On the other hand, the scanning signals A1 through A8 are supplied to an arrangement 11 for forming an incremental signal IN. This arrangement 11 has a converter device 12, in order, from the scanning signals A1, A3, A6, A7 obtained by the detectors D1 through D8 at the transitions K1, K2, K3, K4 and extending variously as a function of the type of transition, to form respective identically extending partial signals TA1, TA3, TA6 and TA7 at each of the transitions K1 through K4, regardless of the type of transition. Moreover, the arrangement 11 has a collection device 13, which combines these partial signals TA1, TA3, TA6 and TA7, in order to form from them the incremental signal IN as an analog periodic signal having the period length equal to the width B of a code element C1 through C8.

In the present invention, unlike the prior art, it is not the periodic arrangement of code elements C1 through C8 that is needed for forming the incremental signal IN. Instead, the fact that the transitions K1, K2, K3 and K4 from one code element of one property to one code element of the other property occur at positions that are predetermined by a matrix of width B is exploited. In this example, the transition from C1 to C2, from C3 to C4, from C6 to C7, and from C7 to C8—that is, the edges are exploited.

If one looked at the scanning signals A1 through A8, detected by the detectors D1 through D8 at the transitions K1 through K4 of the code 1 (FIG. 2a), of which scanning signals only one is shown in FIG. 2B, it can be seen that they extend differently, as a function of the change at the transitions K1 through K4. At the transitions K1 and K3, the scanning signals A1 through A8 change from a high level to a lower level, and at the transitions K2 and K4, the scanning signals A1 through A8 change from a low level to a high level. The converter device 12 is now provided to enable using all the transitions K1 through K4 within the fragment T for forming the incremental signal IN, specifically regardless of the type of transition.

The converter device 12 has the function of converting the especially small scanning signals, generated in the middle of the code elements C2, C3, C7, and the especially large scanning signals, generated in the middle of the code elements C1, C4, C5, C6, C8, into approximately identical output signals. The shape of these output signals must differ from the shape that occurs at the transitions K1 through K4. It is advantageous if at the transitions K1 through K4, regardless of the type of transition, whether bright to dark or dark to bright, especially high signals are generated, and in the middles of the code elements C1 through C8, especially low signals are generated. The transmission characteristic of the converter device 12 is optimized in that respect. For this purpose, the converter device 12 has a nonlinear transmission characteristic, in particular a quadratic transmission characteristic, which converts input signals, which are identical in amount but differ in their sign, into an identical output signal. Nonlinear components such as transistors, FETs, or diodes are suitable for attaining this. Upon a shift of the code 1, the matrix of transitions K1 through K4 is moved across the detectors D1 through D8, so that from the transitions K1 through K4, a periodic sinusoidal signal change having the period B is created. One of these thus-generated intermittently periodic partial signals is shown in FIG. 2c.

With the arrangement 11, a relatively simple method that is attainable through hardware and that ascertains a middle position of all the detected transitions K1 through K4 of the code 1 in parallel and thus quickly is made possible.

The analog sinusoidal periodic incremental signal IN can be subdivided and digitized by an interpolator 14, and this position datum D serves to attach the low-resolution absolute position datum CW to the signal period of an incremental track 20. For that purpose, the position datum D within the width B is unequivocally absolute and has a resolution that is less than the resolution of the position obtained from the incremental track 20. This code attachment takes place in a code attachment device 16, in which the position datum D is on the one hand attached to the code word CW and on the other attached to a fine value F obtained by scanning the incremental track 20. A resultant absolute position ABS having the resolution of the incremental track 20 is then available at the output of the scanning unit 10 and can be output in a known manner, preferably via a serial interface.

The division period of the graduation of the incremental track 20 is typically 20 μm, and the width B of the code elements C1 through C8 is typically greater than 80 μm, for instance 200 μm.

As already indicated at the outset, the formation of only a single periodic incremental signal IN is described above. In practice, it is advantageous if in the same way a plurality of incremental signals, phase-shifted from one another by 90° or 180°, are formed which can then be processed in a known manner. To generate a second incremental signal which is phase-shifted from the incremental signal IN, a second set of detectors is necessary, which is offset from the first set by a fraction of the width B of one code element. To generate a signal phase-shifted by 120°, the offset is B/3; for generating a signal phase-shifted by 90°, the offset is B/4. In general terms, to generate N incremental signals $2\pi/N$ radians phase-shifted from one another, N sets of detectors are necessary; then N detectors are assigned to each code element, and within the fragment T, (N×M) detectors must then be provided, where N=a natural number greater than or equal to 1. For each set of detectors, one collection device is provided, so that each Nth detector is supplied to the Nth collection devices. Each of the collection devices furnishes one of the incremental signals, phase-shifted from one another, with a mutual phase shift of $2\pi/N$.

Figure 3:
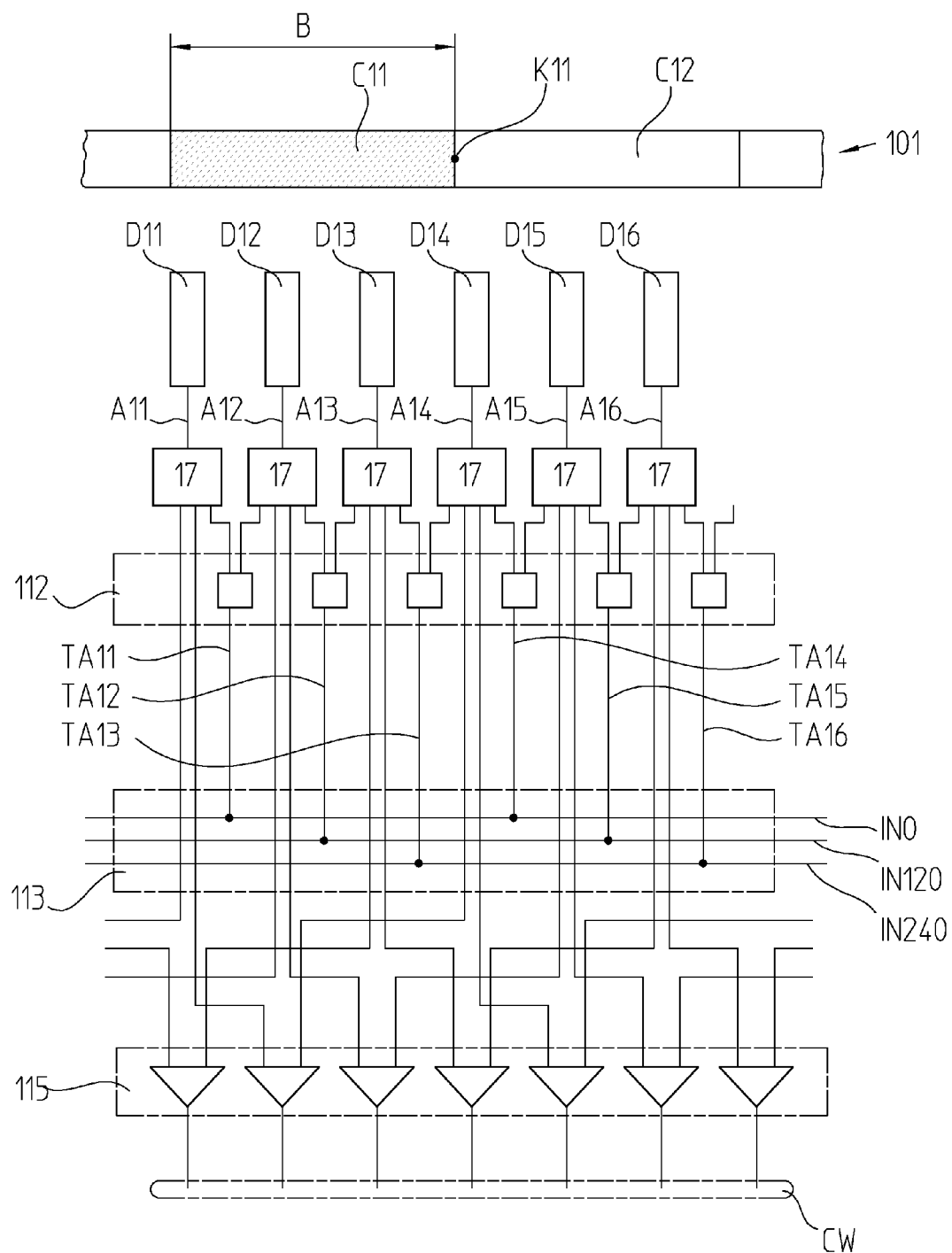
FIG. 3 shows a schematic illustration of a second embodiment of a position measuring device for generating three incremental signals phase-shifted from one another in accordance with the present invention.

In a second example, shown in FIG. 3, a further especially advantageous feature of the present invention will be explained. As the code 101, a so-called Manchester code is used, which ensures that within the scanned fragment, enough transitions K11 in the matrix having width B (hereinafter called "matrix B") occur that periodic incremental signals IN0, IN120, IN240 with the period length B can be formed. The code 101 again includes a sequence, disposed in series with one another in the measurement direction X, of code elements C11 and C12 of equal length, of which only two are shown in FIG. 3. The code element C11 is embodied as complementary to the code element C12. "Complementary" means that they have inverse properties; that is, in the optical scanning principle, they are transparent and nontransparent, or reflective and nonreflective. The succession of complementary code elements C11 and C12 determines whether the bit 0 or 1 is assigned to the field of the width (2×B). The code value formation is explained in detail in EP 1468254 B1.

For generating three incremental signals IN0, IN120, IN240, phase-shifted by 120° from one another, three sets of detectors D11 through D16 are provided. The detectors of one set are disposed in the matrix B and are separated from one another by the width of the matrix B. In addition, the detectors of the sets are each offset from one another by B/3. The detectors D11 and D14 form the first set of detectors for generating the first incremental signal IN0; the detectors D12 and D15 form the second set for generating the second incremental signal IN120; and the detectors D13 and D16 form the third set for generating the third incremental signal IN240.

The converter device 112 is embodied for comparing each of the scanning signals A11 through A16 with a scanning signal A11 through A16 generated by the adjacent detector D11 through D16, and for rectifying the thus-formed difference, in order to obtain the requisite partial signals TA11 through TA16. An especially high partial signal TA11 through TA16 is generated if the scanning signals A11 through A16 of the adjacently disposed detectors D11 through D16 differ greatly, regardless of the sign of the difference. High partial signals TA11 through TA16 are therefore associated with the transitions K11. By this provision, the transitions K11 are weighted in a special way. The thus-generated partial signals TAIL TA14 and TA12, TA15 and TA13, TA16 of one set of detectors D11, D14 and D12, D15 and D13, D16 are each added up in the collection device 113 to form one of the incremental signals IN0, IN120, IN240.

The generation of the code word CW takes place in the evaluation unit 115 in accordance with EP 1468254 B1, which is hereby incorporated by reference.

The scanning signals may be voltages or currents. If currents are used, then suitable components 17, of the kind schematically shown in FIG. 3, are used for multiplying a current.

Figure 4:
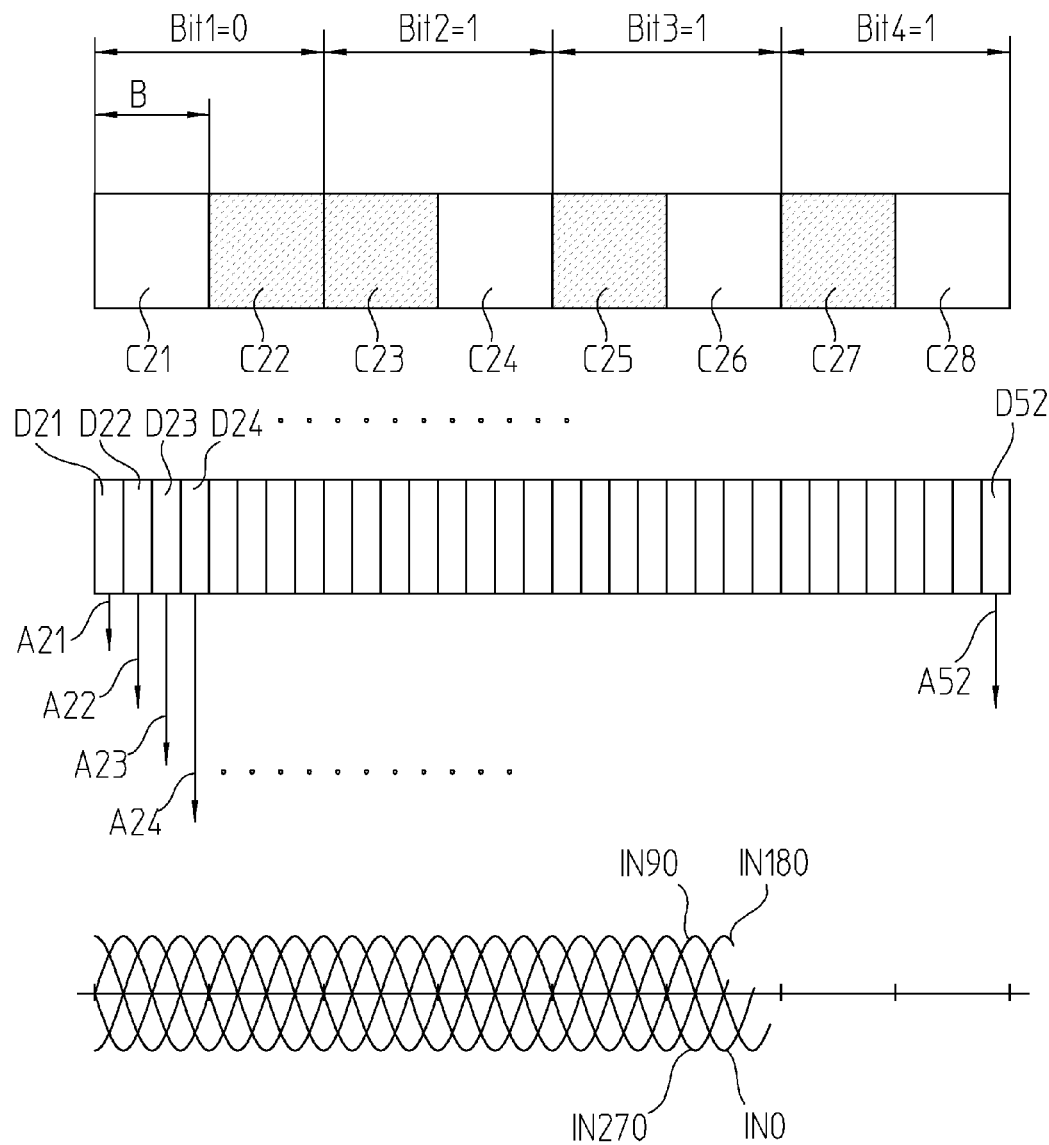
FIG. 4 shows a schematic illustration of possible code and embodiments of detectors assigned to that code as well as the four incremental signals phase-shifted from one another that can be generated thereby in accordance with the present invention.

In FIG. 4, an arrangement of code elements C21 through C28 with an arrangement of N=4 sets of detects D21 through D52 for generating four incremental signals IN0, IN90, IN180 and IN270, phase-shifted from one another by 90°, is shown. The code arrangement is a Manchester code, in which the bit datum is defined in a known manner by the succession of two code elements C21, C22 and C23, C24 and C25, C26 and C27, C28. Four detectors D21 through D52 are disposed within each code element C21 through C28. By detecting all the bright/dark transitions, the incremental signals IN0, IN90, IN180 and IN270 have a period length of B. The incremental signals IN0, IN90, IN180 and IN270 are again generated by finding the difference between adjacent detectors D21 through D52, ensuing rectification and ensuing summation of the thus-formed partial signals:

$$IN0=|A22-A23|+|A26-A27|+|A30-A31|+|A34-A35|+\ldots.$$

$$IN90=|A23-A24|+|A27-A28|+|A31-A32|+|A35-A36|+\ldots.$$

$$IN180=|A24-A25|+|A28-A29|+|A32-A33|+|A36-A37|+\ldots.$$

$$IN270=|A25-A26|+|A29-A30|+|A33-A34|+|A37-A38|+\ldots.$$

Alternatively, the incremental signals can be formed by the following equations:

$$IN0=|(A21+A22)-(A23+A24)|+|(A25+A26)|-|(A27+A28)|+|(A29+A30)-(A31+A32)|+|(A33+A34)-(A35+A36)|+\ldots.$$

$IN90=|(A22+A23)-(A24+A25)|+|(A26+A27)-(A28+A29)|+|(A30+A31)-(A32+A33)|+|(A34+A35)-(A36+A37)|+\ldots$ In summary, the present invention thus relates to a position measuring device having a code 1, 101, including a sequence of code elements C1 through C28 of equal width B, disposed in the measurement direction X, and having a first and a second property, the code elements C1, C4, C5, C6, C8, C12, C21, C24, C26, C28 having the first property and the code elements C2, C3, C7, C11, C22, C23, C25, C27 having the second property each being disposed aperiodically. Depending on the property of the code element C1 through C28, a scanning signal A1 through A52 with a high signal level or a low signal level is generated. The position measuring device has a scanning unit 10 with a plurality of detectors D1 through D52 each for scanning one fragment T of the code 1, 101 at least at scanning positions in a scanning matrix B, and for forming a code word CW, defining the absolute position, from the various signal levels and at least one incremental signal IN, IN0, IN90, IN180, IN270, IN120, IN240 from scanning signals A1 through A52 obtained by means of the detectors D1 through D52. The arrangement of detectors D1 through D52 in the scanning matrix B means that there need not necessarily be a detector D1 through D52 present at each predetermined position in the spacing matrix B. The position measuring device includes an arrangement 11 for forming the incremental signal IN0, IN90, IN180, IN270, IN120, IN240 and having a converter device 12, 112 and a collection device 13, 113 downstream of the converter device 12, 112; the converter device 12, 112 converts the scanning signals A1 through A52 into partial signals TA1 through TA16 in such a way that the partial signals TA1 through TA16, derived from the absolute positions in the spacing matrix B and combined by the collection device 13, 113, form the at least one incremental signal IN0, IN90, IN180, IN270, IN120, IN240 as a periodic signal having the period corresponding to the width B. The converter device 12, 112 has the function of converting the scanning signals A1 through A52, derived at transitions K1 through K12 from one of the code elements C1, C4, C5, C6, C8, C12, C21, C24, C26, C28 of one property to one of the code elements C2, C3, C7, C11, C22, C23, C25, C27 of the other property, each into partial signals TA1 through TA36 having a periodic signal shape of the period B, and this periodic signal shape is independent of whether the transition K1 through K12 is from the first property to the second property, or from the second property to the first property. The scanning signals A1 through A52, derived from the other regions of the code elements C1, C4, C5, C6, C8, C12, C21, C24, C26, C28 having the first property and the code elements C2, C3, C7, C11, C22, C23, C25, C27 having the second property, are each converted into identically extending partial signals TA1 through TA16. The periodic signal shape, viewed from each of the transitions K1 through K12, is present in a range +B/2 and −B/2. "Identically extending partial signals TA1 through TA16" means that the signal shape of the scanning signals A1 through A52, outside these transition regions K1 through K12, has a constant level, specifically regardless of the property of the code element C1 through C28.

Advantageously, the converter device 112 is embodied for comparing each of the scanning signals A11 through A52 with a reference signal and rectifying the difference formed by the comparison. The reference signal may be a predetermined constant signal, or a scanning signal A11 through A52 which derives from a scanning position spaced apart in the measurement direction X, that is, from an adjacent detector D11 through D52.

Figure 5:
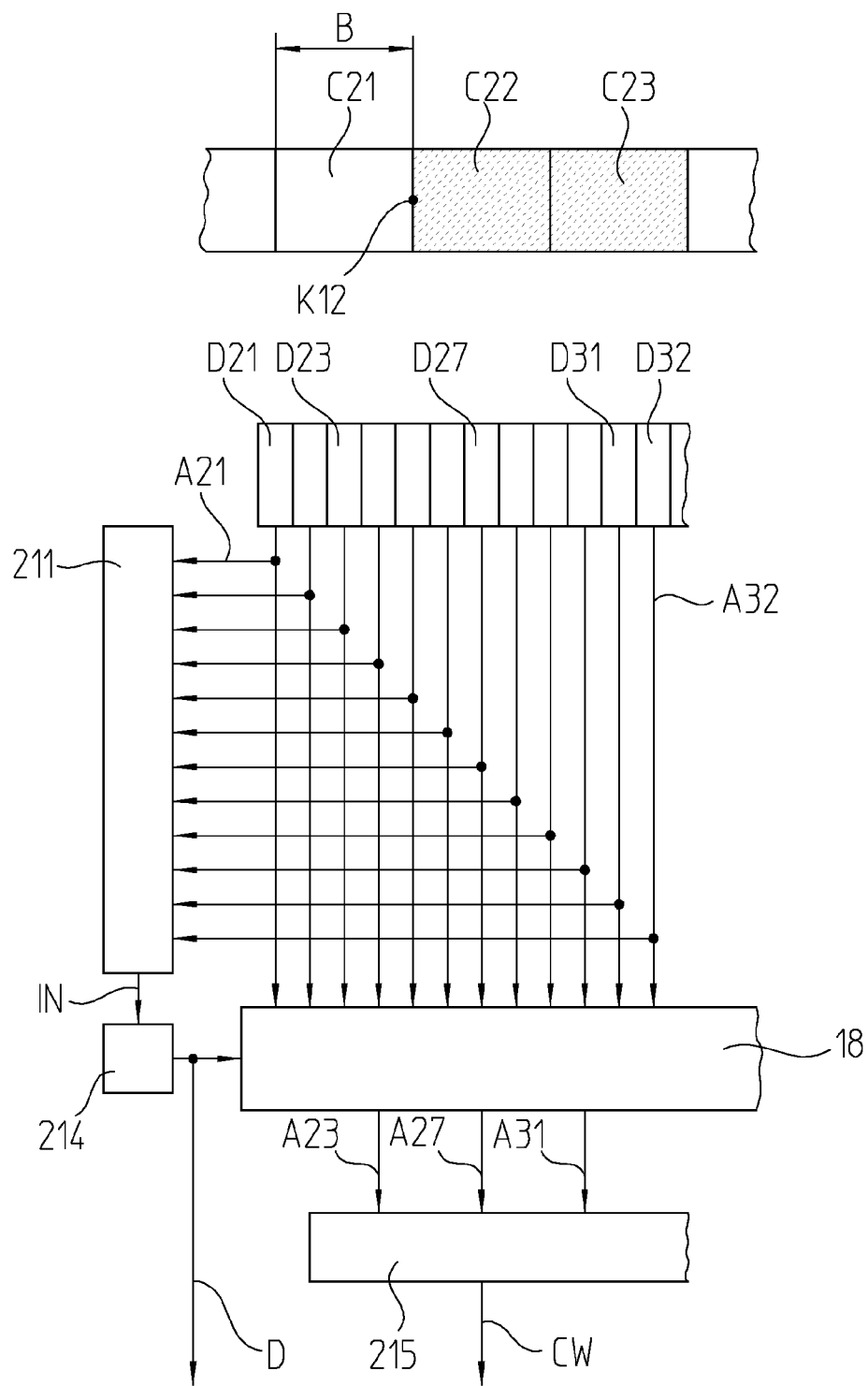
FIG. 5 shows the use of an incremental signal for evaluating the code of FIG. 4.

In conjunction with FIG. 5, it will be explained how the incremental signals IN0, IN90, IN180 and IN270, generated in accordance with FIG. 4 from the code elements C21 through C28, can also be used for correctly forming the code word CW. The mode of operation will be explained in terms of one fragment having three code elements C21, C22 and C23, for the scanning of which, in the instantaneous position shown, the detectors D21 through D32 are used. The scanning signals A21 through A32 of the detectors D21 through D32 are supplied to the arrangement 211 for forming the four incremental signals IN0, IN90, IN180 and IN270 phase-shifted by 90° from one another, which in the drawing are merely marked IN. From these incremental signals IN0, IN90, IN180 and IN270, the interpolator 214 forms an absolute position datum D, which in each case unequivocally absolutely subdivides the length B.

In DE 4123722 A1, it is explained that for secure formation of a code word, the scanning signals which scan an unequivocal region of a code element are selected. In EP 1329696 A1, the secure formation of a code word based on a Manchester code is explained. In both cases, the selection of the correct scanning signals is made from the position datum of an incremental track disposed next to the code. Advantageously, the position datum D generated according to the invention is now used for correct selection of the scanning signals A23, A27, A31 for forming the code word CW. For that purpose, the scanning signals A21 through A32 are supplied to a selector device 18, which as a function of the position datum D selects the scanning signals A23, A27, A31 that are suitable for securely forming the code word CW. The scanning signals that are suitable, A23, A27, A31, are those which scan the middle regions of the code elements C21, C22 and C23, so that for forming the code word CW, the scanning signals A21, A25 and A29 derived from the ambiguous transitions are not used.

Figure 6:
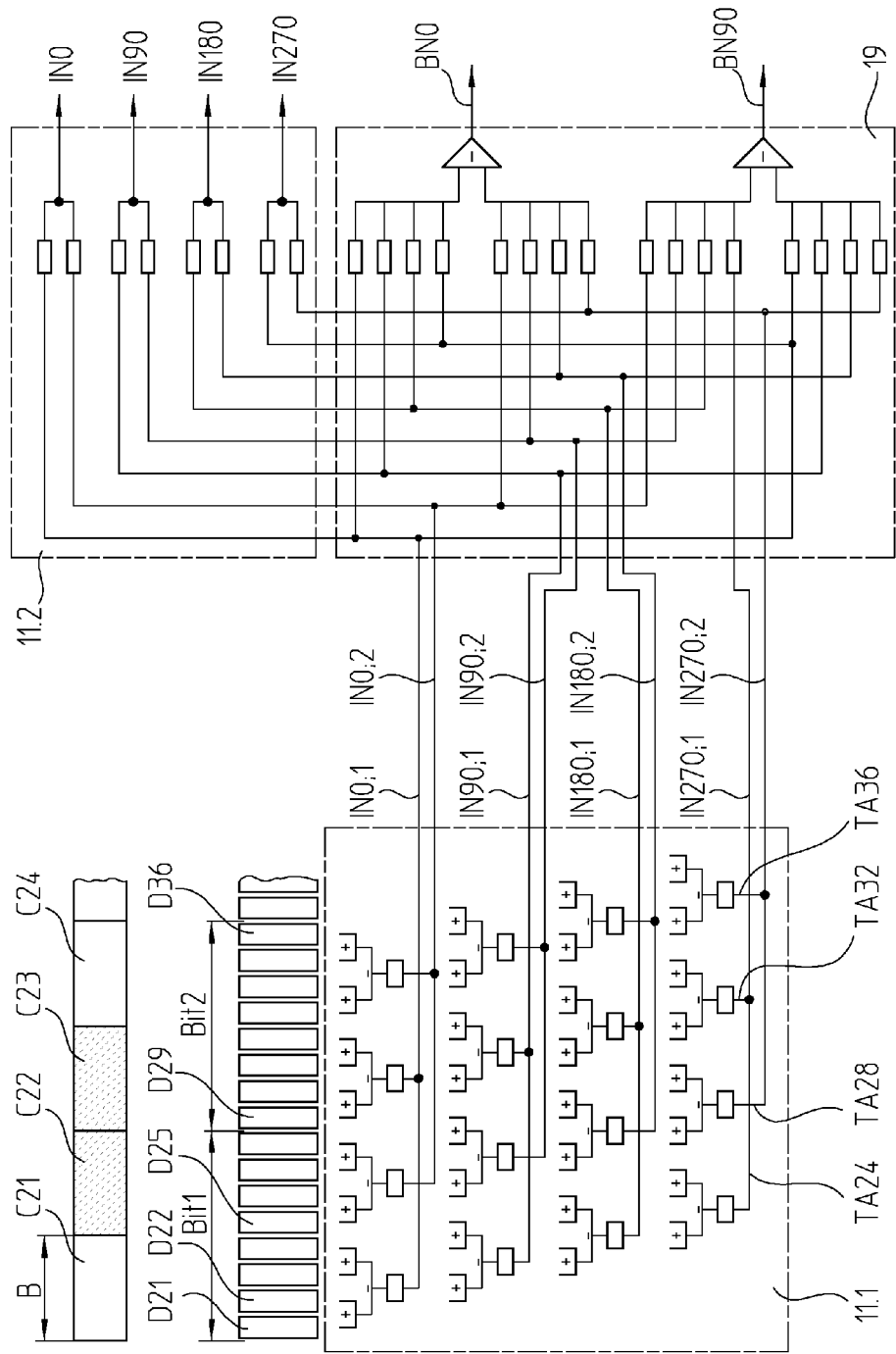
FIG. 6 shows an embodiment of a circuit arrangement for generating four incremental signals, phase-shifted from one another, corresponding to the width of one code element and for generating incremental signals corresponding to twice the width of one code element in accordance with the present invention.

In conjunction with FIG. 6, it will now be explained how even incremental signals BN0, BN90 having a period of the width 2×B can be generated with the present invention. Specifically, it can be especially advantageous for incremental signals BN0, BN90 which have a period of length 2×B, or in other words which furnish an unequivocal position datum within one bit, to be derived from a Manchester code. When a Manchester code is used, one bit of the code word CW is formed from the comparison, in particular difference forming, of scanning signals of two successive code elements. From the at least one periodic incremental signal BN0, BN90 having the period 2×B, the scanning signals suitable for the comparison are now determined. In other words, the position datum obtained from the incremental signals BN0, BN90 is utilized for defining the correct difference formation for generating one bit from the two complementary code elements of the bit. The recognition of the generation of a bit by difference formation can be a prerequisite here, but reference may be made to EP 1468254 B1, and therefore further explanations are superfluous.

In detail, the generation of two incremental signals BN0 and BN90 of period 2×B that are phase-shifted from one another by 90° will now be explained. FIG. 6 shows a fragment of a Manchester code, which in turn includes a plurality of code elements C21 through C24 disposed in series with one another. For scanning, a plurality of detectors are used, of which the detectors D21 through D36 are shown. The detectors D21 through D36 form four sets of detectors for generating four incremental signals IN0, IN90, IN180, IN270, phase-shifted by 90° from another, as already explained above. The scanning signals of adjacent detectors are compared with one another, and the outcome of comparison is rectified. The rectified signals are the partial signals, of which for the sake of simplicity only the partial signals TA24, TA28, TA32 and TA36 are identified in FIG. 6. The partial signals each derived at scanning positions in the matrix B are combined, that is, added up. Thus in FIG. 6, the scanning signals of two detectors D21, D22 each are added up to form a scanning signal which is represented by the plus sign "+", and are compared with the sum of the adjacent scanning signals D23, D24, which is represented by the subtraction sign "–". The difference (A21+A22)–(A23+A24) is rectified. In the arrangement 11.1, the following sums of rectified partial signals are now formed:

$$IN0;1=|(A21+A22)-(A23+A24)|+|(A29+A30)-(A31+A32)|+|(A33+A34)-(A35+A36)|+\ldots$$

$$IN0;2=|(A25+A26)-(A27+A28)|+|(A33+A34)-(A35+A36)|+\ldots$$

$$IN90;1=|(A22+A23)-(A24+A25)|+|(A30+A31)-(A32+A33)|+\ldots$$

$$IN90;2=|(A26+A27)-(A28+A29)|+|(A34+A35)-(A36+A37)|+\ldots$$

$$IN180;1=|(A23+A24)-(A25+A26)|+|(A31+A32)-(A33+A34)|+|(A35+A36)-(A37+A38)|+\ldots$$

$$IN180;2=|(A27+A28)-(A29+A30)|+|(A35+A36)-(A37+A38)|+\ldots$$

$$IN270;1=|(A24+A25)-(A26+A27)|+|(A32+A33)-(A34+A35)|+\ldots$$

$$IN270;2=|(A28+A29)-(A30+A31)|+|(A36+A37)-(A38+A39)|+\ldots$$

In the arrangement 11.2, these sums of partial signals are further added to the periodic analog incremental signals phase-shifted from one another by 90° and having the period B:

$$IN0=IN0;1+IN0;2$$

$$IN90=IN90;1+IN90;2$$

$$IN180=IN180;1+IN180;2$$

$$IN270=IN270;1+IN270;2$$

The sinusoidal shape of these incremental signals IN0, IN90, IN180 and IN270 is very good because of the averaging over many code elements and transitions, so that by means of them, very precise determination of an absolute position within the width B by known interpolation methods is made possible.

For generating the incremental signals BN0 and BN90 having the period 2×B, these signals are linked:

$$BN0=(IN0;1+IN90;1+IN1801+I270;1)-(IN0;2+IN90;2+IN180;2+IN270;2)$$

$$BN90=(IN0;2+IN90;2+IN180;2+IN270;2)-(IN0;1+IN190;1+IN180;2+IN270;2)$$

The form of these incremental signals BN0 and BN90 is suited for thus making an unequivocal distinction possible between the region B on the right and on the left within 2×B of the Manchester code 101.

In the optical scanning principle, all the elements of the scanning unit 10 can be embodied in a space-saving way in an opto-ASIC. The present invention is not limited to the optical scanning principle, however. For instance, magnetic, inductive or capacitive position measuring devices could for instance be designed according to the present invention. The type of detectors and the embodiment of the first and second properties of the code elements must then be selected in accordance with the scanning principle; otherwise, however, the above description can be adopted directly.

The absolute position measuring device can be used for measuring linear or rotational motions; the code 1, 101 is mounted on one of the moving objects and the scanning unit 10 on the other of the objects to be measured. The code 1, 101 can be mounted directly on the object to be measured or mounted on a scale which is then in turn coupled to the object to be measured.

Further embodiment variations of the method and devices in accordance with the present invention of course exist besides the explained examples and embodiments.

We claim:

1. A position measuring device comprising:
   a code comprising a sequence of code elements of equal width B that is disposed in a measurement direction, wherein said sequence of codes elements comprises:
      a first set of code elements comprising a first property; and
      a second set of code elements comprising a second property, wherein said first set and said second set of code elements are each being disposed aperiodically,
   a scanning unit comprising a plurality of detectors for scanning said code and obtaining scanning signals, and for forming a code word defining an absolute position is defined from said scanning signals, and
   an arrangement for forming at least an incremental signal from said scanning signals, wherein said arrangement comprises:
      a converter device; and
      a collection device arranged downstream of said converter device, wherein said collection device forms respective intermittently periodic partial signals from said scanning signals derived from scanning positions in a spacing matrix.

2. The position measuring device as defined by claim 1, wherein said converter device converts said scanning signals, derived at transitions from one of said code elements of said first property to one of said code elements of said second property, into partial signals having a periodic signal shape of a period having a value B, and wherein said periodic signal shape is independent of whether said transition is from said first property to said second property, or from said second property to said first property.

3. The position measuring device as defined by claim 1, wherein said converter device has a nonlinear transmission characteristic.

4. The position measuring device as defined by claim 3, wherein said nonlinear transmission characteristic is a quadratic transmission characteristic.

5. The position measuring device as defined by claim 2, wherein said converter device has a nonlinear transmission characteristic.

6. The position measuring device as defined by claim 5, wherein said nonlinear transmission characteristic is a quadratic transmission characteristic.

7. The position measuring device as defined by claim 1, wherein to generate N incremental signals phase-shifted from one another, N sets of detectors are provided, where N equals a natural number greater than or equal to 1, and said N detectors are disposed at the respective spacing of B/N within a width B, and for each of said N sets of detectors one collection device is provided for forming one of said incremental signals phase-shifted from one another.

8. The position measuring device as defined by claim 1, wherein said converter device compares each of said scanning signals with a reference signal and rectifies a difference formed by said comparison.

9. The position measuring device as defined by claim 8, wherein said reference signal is at least one scanning signal of a further detector spaced apart in said measurement direction.

10. The position measuring device as defined by claim 1, wherein said code elements are designed to be optically scannable, in that said first set of code elements having said first property are transparent and said second set of code elements having said second property are nontransparent.

11. The position measuring device as defined by claim 1, wherein said code elements are designed to be optically scannable, in that said first set of code elements having said first property are reflective and said second set of code elements having said second property are nonreflective.

12. The position measuring device as defined by claim 1, wherein a majority of said plurality of detectors are assigned over a distance equal to B; and said scanning signals are delivered to a selector device, which as a function of a position datum derived from said incremental signal selects a set of scanning signals from said scanning signals that are suitable for forming said code word.

13. The position measuring device as defined by claim 1, wherein said code is a Manchester code.

14. The position measuring device as defined by claim 1, further comprising a circuit that forms a periodic incremental signal from said partial signals, wherein said formed periodic incremental signal has a period of 2×B.

15. A method for position measurement, the method comprising:
    scanning a code by a plurality of detectors so as to generate scanning signals, wherein said code comprises a sequence of code elements of equal width B and disposed in a measurement direction, wherein said sequence of codes elements comprises:
        a first set of code elements comprising a first property; and
        a second set of code elements comprising a second property, wherein said first set and said second set of code elements are each being disposed aperiodically,
    forming a code word from said scanning signals, wherein said code word defines an absolute position;
    forming at least an incremental signal from said scanning signals, wherein said forming comprises:
        obtaining a set of scanning signals at scanning positions in a spacing matrix;
        converting said set of scanning signals into intermittently periodic partial signals; and
        combining said intermittently periodic partial signals to form said incremental signal.

16. The method as defined by claim 15, further comprising converting said scanning signals that are derived at transitions from a code element of said first set of code elements and a code element of said second set of code elements into partial signals having a periodic signal shape of a period having a value B, and said periodic signal shape is independent of whether said transition is from said first property to said second property, or from said second property to said first property.

17. The method as defined by claim 15, wherein said intermittently periodic partial signals are formed in that each of said scanning signals is compared with a reference signal, and a difference formed by said comparison is rectified.

18. The method as defined by claim 17, wherein said reference signal is a scanning signal of an additional detector disposed spaced apart in said measurement direction.

19. The method as defined by claim 15, wherein over a distance equal to B a plurality of scanning signals are derived, which are delivered to a selector device which selects scanning signals as a function of a position datum derived from said incremental signal, said selected scanning signals are suitable for forming said code word.

20. The method as defined by claim 15, comprising forming at least one periodic incremental signal having a period 2×B based on said intermittently periodic partial signals.

21. The method as defined by claim 15, wherein said code is a Manchester code and one bit of said code word is formed from a comparison of scanning signals of two code elements.

22. The method as defined by claim 20, wherein said code is a Manchester code and one bit of said code word is formed from a comparison of scanning signals of two code elements.

23. The method as defined by claim 22, comprising determining scanning signals suitable for said comparison from said at least one periodic incremental signal having said period 2×B.

24. A position measuring device comprising:
    a code comprising a sequence of code elements of equal width B that is disposed in a measurement direction, wherein said sequence of codes elements comprises:
        a first set of code elements comprising a first property; and
        a second set of code elements comprising a second property, wherein said first set and said second set of code elements are each disposed aperiodically;
    a scanning unit comprising a plurality of detectors for scanning said code and obtaining scanning signals, and for forming a code word defining an absolute position from said scanning signals; and
    an arrangement for forming incremental signals from said scanning signals, phase-shifted by 90° from each other, wherein a majority of said plurality of detectors are assigned over a distance equal to B, and said scanning signals are delivered to a selector device, which as a function of a position datum derived from said incremental signals, selects a set of scanning signals from said scanning signals that are suitable for forming said code word.

25. The position measuring device as defined by claim 24, wherein said function of a position datum derived from said incremental signals is an interpolated position datum, which unequivocally absolutely subdivides the width B.

26. A position measuring device comprising:
    a code comprising a sequence of code elements of equal width B that is disposed in a measurement direction, wherein said sequence of codes elements comprises:
        a first set of code elements comprising a first property; and
        a second set of code elements comprising a second property, wherein said first set and said second set of code elements are each disposed aperiodically,
    a scanning unit comprising a plurality of detectors for scanning said code and obtaining scanning signals, and for forming a code word defining an absolute position from said scanning signals, and
    a circuit for forming at least a periodic incremental signal from said scanning signals, wherein said formed periodic incremental signal has a period of 2×B.

* * * * *

UNITED STATES PATENT AND TRADEMARK OFFICE
CERTIFICATE OF CORRECTION

PATENT NO.       : 8,570,621 B2                                          Page 1 of 1
APPLICATION NO.  : 12/989691
DATED            : October 29, 2013
INVENTOR(S)      : Braasch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Twenty-second Day of September, 2015

Michelle K. Lee
*Director of the United States Patent and Trademark Office*